United States Patent
Lee

(10) Patent No.: US 6,371,613 B1
(45) Date of Patent: Apr. 16, 2002

(54) LENS FRAME FOR SPECTACLES

(76) Inventor: Hwi Jae Lee, 201-905, Samik-newtown Apt, #308-11, Naedang-dong, Seo-gu, Taegu (KR)

( * ) Notice: Subject to any disclaimer, the term of this patent is extended or adjusted under 35 U.S.C. 154(b) by 0 days.

(21) Appl. No.: 09/750,712

(22) Filed: Jan. 2, 2001

(30) Foreign Application Priority Data

Sep. 30, 2000 (KR) .............................. 00-27448

(51) Int. Cl.[7] .................................. G02C 1/08
(52) U.S. Cl. ........................................ 351/90; 351/96
(58) Field of Search ................... 351/90–101, 140, 351/141, 150

(56) References Cited

U.S. PATENT DOCUMENTS

| | | | | |
|---|---|---|---|---|
| 1,599,870 A | * | 9/1926 | Boutelle | 351/92 |
| 1,906,330 A | * | 5/1933 | Nelson | 351/90 |
| 2,529,879 A | * | 11/1950 | Levoy | 351/90 |
| 4,674,852 A | * | 6/1987 | Tanaka | 357/90 |
| 5,579,062 A | * | 11/1996 | Sondrol | 351/92 |

* cited by examiner

Primary Examiner—Huy Mai

(57) ABSTRACT

A lens frame for spectacles, wherein an elastic segment is disposed between a pair of assembling pieces which are formed at both free ends of the lens frame, with the free ends defining an assembling region. When lenses are fitted into the lens frame, the pair of assembling pieces and the elastic segment are clamped together by a screw which passes therethrough.

6 Claims, 4 Drawing Sheets

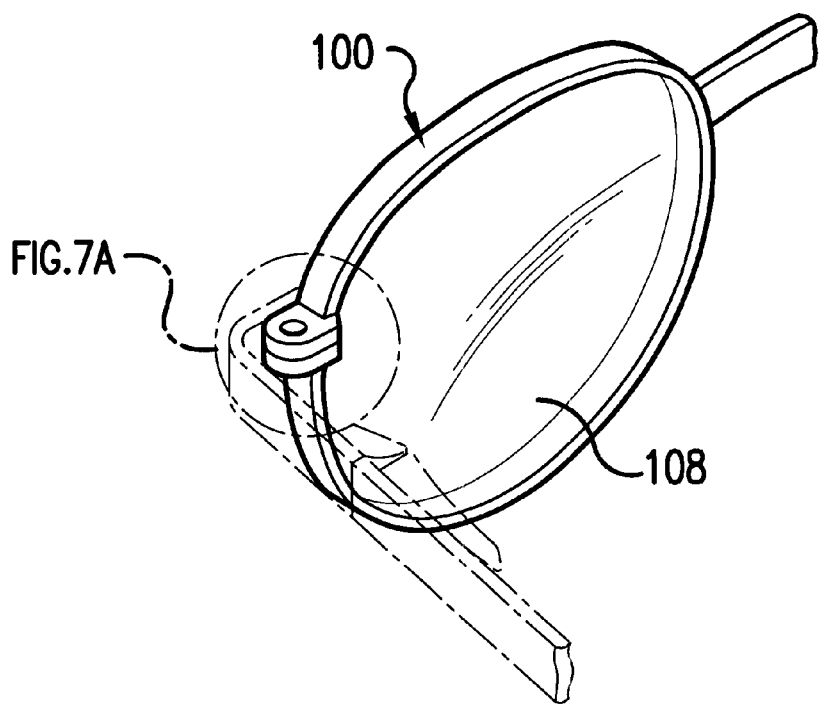
FIG.7
CONVENTIONAL

LENS FRAME FOR SPECTACLES

BACKGROUND OF THE INVENTION

1. Field of the Invention

The present invention relates to a lens frame for spectacles, and more particularly, the present invention relates to a lens frame for spectacles, by which a spectacle lens fitting operation can be implemented in such a way as to accommodate a wide range of dimensional tolerance of a spectacle lens and improve this fatigability of the lens frame by reducing the torsional load.

2. Description of the Related Art

Generally, a conventional lens frame which is used for fitting a lens in the frame of spectacles, is structured as illustrated in FIG. 7 and detailed in FIG. 7A. That is to say, upper and lower assembling pieces 102 and 104 are formed at both free ends of a lens frame 100, respectively, with the free ends defining an assembling region. When a spectacle lens 108 is fitted into the lens frame 100, the upper and lower assembling pieces 102 and 104 are clamped together by a screw 106 which is threadedly coupled in apertures provided in the assembly pieces 102 and 104.

In other words, when the spectacle lens 108 is assembled to the lens frame 100, a screw 106 which clamps the upper and lower assembling pieces 102 and 104 with each other, is unscrewed to slacken the lens frame 100. Then, after fitting the spectacle lens 108 into the lens frame 100, by reclamping the upper and lower assembling pieces 102 and 104 with each other using the screw 106, the spectacle lens 108 is securely assembled to the lens frame 100.

In the conventional lens frame 100 constructed as mentioned above, in order to ensure a secure and aesthetic assemblage of the spectacle lens 108, the size of the spectacle lens 108 must be precisely in accord with that of the lens frame 100. In this regard, in the case where the size of the spectacle lens 108 is slightly larger or smaller than that of the lens frame 100, a secure assemblage of the spectacle lens 108 cannot be effected whereby the aesthetic appearance of the lens frame 100 is adversely affected.

As a consequence, a lens cutting operation using a lens cutting machine must be performed in a precise and exact manner, with little or no possibility of error in the lens cutting operation.

Furthermore, in the case that a torsional load is applied to the lens frame 100 while the spectacles are being worn, since no cushioning function is rendered by the lens frame 100, stress is frequently induced in the lens frame 100.

Accordingly, the present invention provides a lens frame for spectacles, in which an elastic segment made of a material having a predetermined elasticity, such as rubber or the like, is positioned between upper and lower assembling pieces of the lens frame, whereby, even in the case where the size of spectacle lens to be fitted into the lens frame is smaller or larger than that of the lens frame, a secure and aesthetic assemblage of the spectacle lens can be implemented.

In order to achieve the above object, according to one aspect of the present invention, there is provided a lens frame for spectacles, wherein an elastic segment is interposed between a pair of assembling pieces which are formed at both free ends of the lens frame, respectively, with the free ends defining an assembling region. When a lens is fitted into the lens frame, the pair of assembling pieces and the elastic segment are clamped together by a screw which passes through apertures provided in the assembly pieces and the elastic segment.

It is preferred that the elastic segment which is used in the lens frame according to the present invention has contoured portions which correspond to those of the assembling pieces and a cross-sectional shape which is substantially the same as that of each assembling piece.

BRIEF DESCRIPTION OF THE DRAWINGS

The above objects, and other features and advantages of the present invention will become more apparent after a reading of the following detailed description when taken in conjunction with the drawings, wherein

FIG. 7 is a partially enlarged perspective view illustrating a conventional lens frame for spectacles.

DETAILED DESCRIPTION OF PREFERRED EMBODIMENTS

Figure 1:
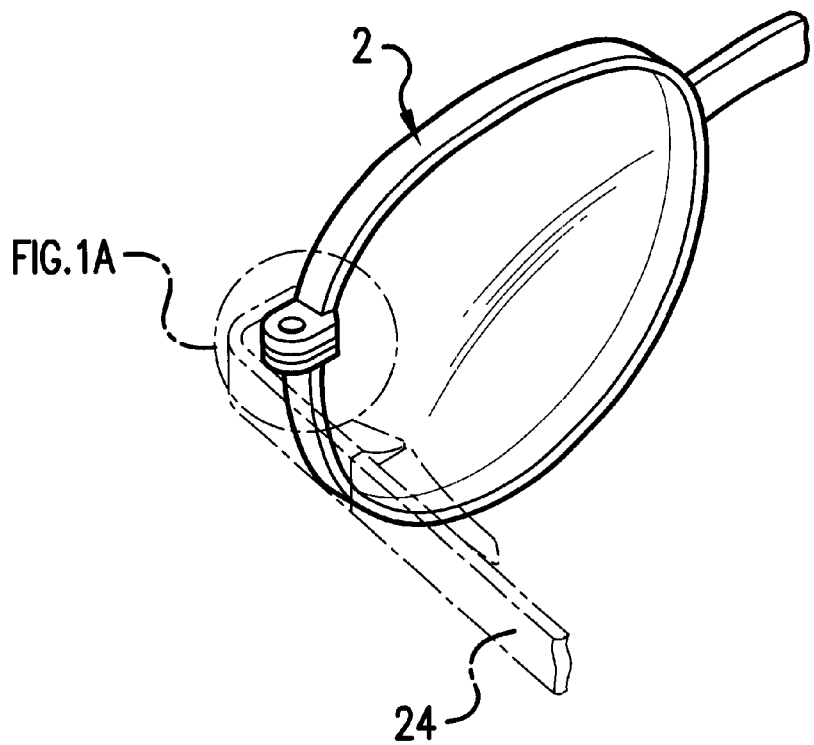
FIG. 1 is a partially enlarged perspective view illustrating a lens frame for spectacles in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1A:
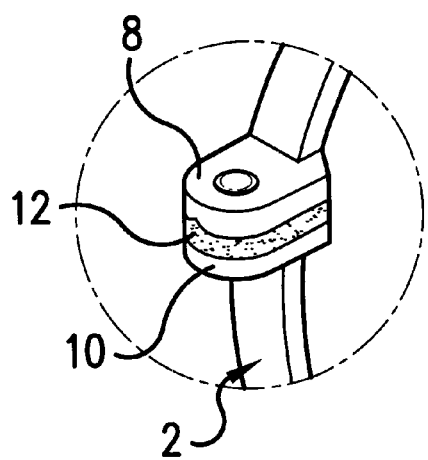
FIG. 1A is a detail of FIG. 1.
Figure 2:
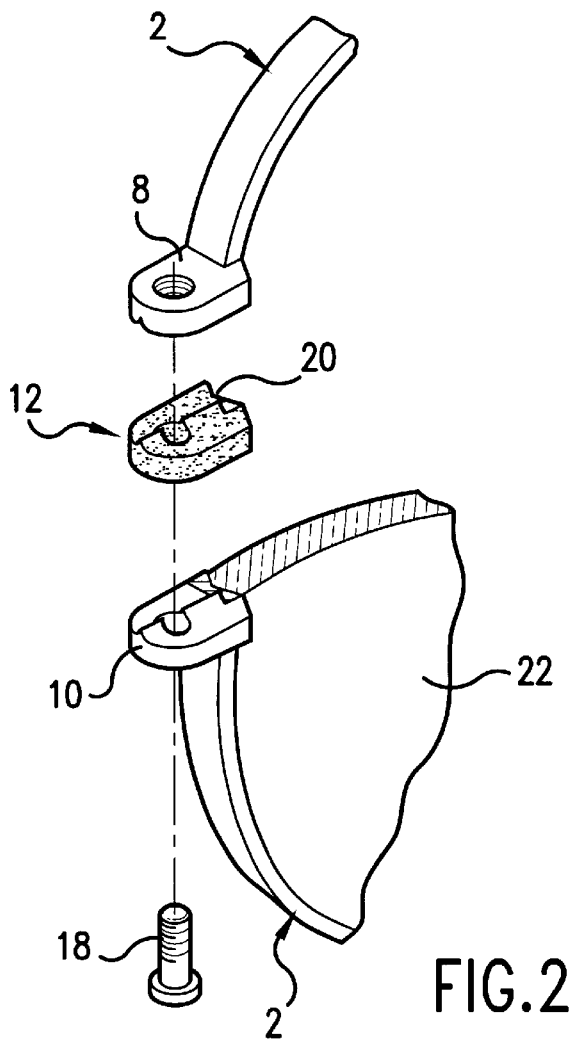
FIG. 2 is an exploded perspective view illustrating the lens frame for spectacles according to the present invention.
Figure 3:
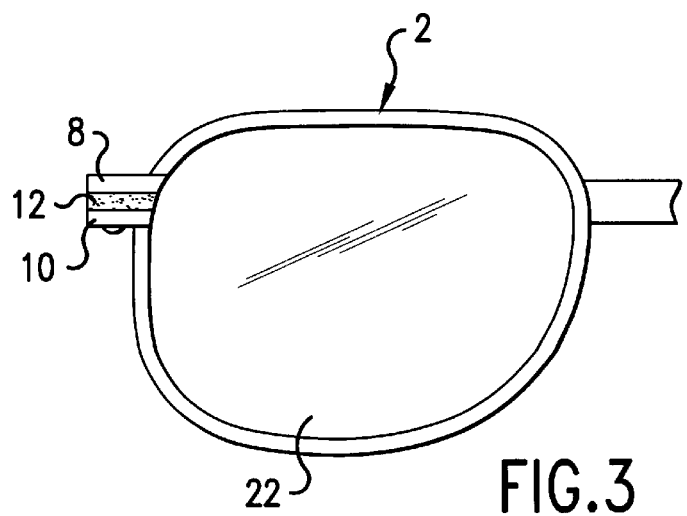
FIG. 3 is a front view illustrating an assembled lens frame for spectacles according to the present invention.
Figure 4:
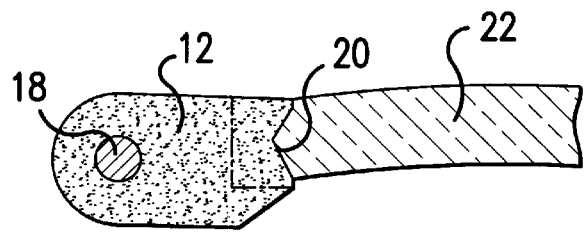
FIG. 4 is a transverse cross-sectional view illustrating a main part of the lens frame for spectacles according to the present invention.
Figure 5:
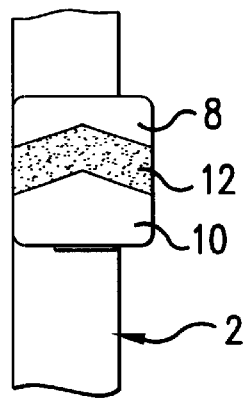
FIG. 5 is a side view illustrating the main part of the lens frame for spectacles according to the present invention.
Figure 6:
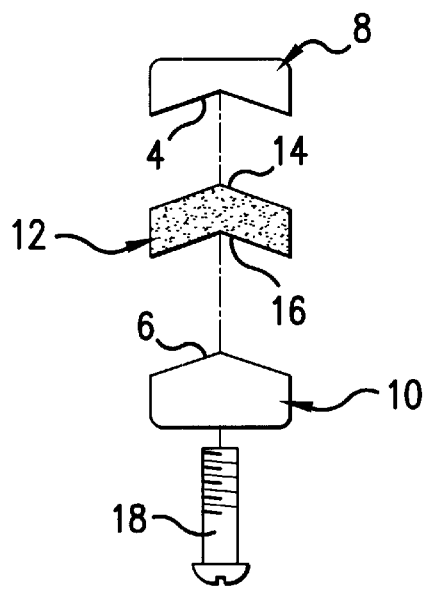
FIG. 6 is an exploded side view illustrating component elements which constitutes the main part of the lens frame for spectacles according to the present invention.
Figure 7A:
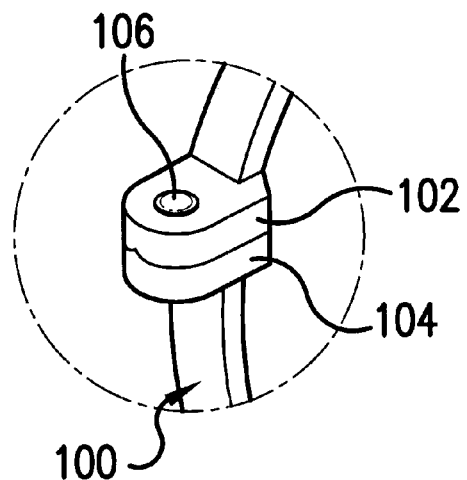
FIG. 7A is a detail of FIG. 7.

FIG. 1 is a partially enlarged perspective view illustrating a lens frame for spectacles in accordance with an embodiment of the present invention with FIG. 1A showing a detail thereof.; and FIG. 2 is an exploded perspective view illustrating the lens frame for spectacles according to the present invention. In the lens frame 2 for spectacles according to the present invention, upper and lower assembling pieces 8 and 10 are formed at both free ends of the lens frame 2, respectively, with the free ends defining an assembling region. A first recessed portion 4 is formed on a lower surface of the upper assembling piece 8, and a first projected portion 6 is formed on an upper surface of the lower assembling piece 10. An elastic segment 12 is interposed between the upper and lower assembling pieces 8 and 10. A second projected portion 14 which is engagable with the first recessed portion 4, is formed on the upper surface of the elastic segment 12, and a second recessed portion 16 which is engagable with the first projected portion 6, is formed on a lower surface of the elastic segment 12. When a spectacle lens 22 is fitted into the lens frame 2, the upper and lower assembling pieces 8 and 10 and the elastic segment 12 are clamped together by a screw 18 which passes through apertures provided in the upper and lower assembly pieces 8 and 10 and also in the elastic segment 12.

At this time, an engaging groove 20 is defined on an inner surface of he elastic segment 12 in a manner such that the inner surface of the elastic segment 12 is flushed with an inner surface of the lens frame 2 including the upper and lower assembling pieces 8 and 10 when the elastic segment 12 is disposed and assembled between the upper and lower assembling pieces 8 and 10.

In the lens frame 2 constructed as mentioned above, because the elastic segment 12 is positioned between the upper and lower assembling pieces 8 and 10 which are formed at both free ends of the lens frame 2, respectively, with the free ends defining the assembling region, when the spectacle lens 22 is fitted into the lens frame 2, even though a size of the spectacle lens 22 is slightly larger or smaller than that of the lens frame 2, a gap is not created between the lens frame 2 and the spectacle lens 22. Thus a secure and aesthetic assemblage of the spectacle lens 22 can be implemented.

Thus, in the case where the size of the spectacle lens 22 is slightly larger than the size of the lens frame 2, the upper and lower assembling pieces 8 and 10 can be assembled with each other using the connecting piece 18 with little or no compression of the elastic segment 12. On the contrary, in the case where the size of the spectacle lens 22 is slightly smaller than a sizes of the lens frame 2, the elastic segment 12 is compressed by the upper and lower assembling pieces 8 and 10, thereby securing the aesthetic assemblage of the spectacle lens 22.

In the above descriptions, the elastic segment 12 can be made of a material having a predetermined elasticity, such as rubber, a foamed resin or the like.

As a result, the lens frame for spectacles according to the present invention provides advantages as described below. That is to say, since an elastic segment is disposed between the pair of assembling pieces of the lens frame, even in the case where the size of a spectacle lens to be fitted into the lens frame is smaller or larger than that of the lens frame, a secure an aesthetic assemblage of the spectacle lens can be implemented with no obstruction, whereby a wide range of dimensional tolerances of the spectacle lens can be accommodated. Further, due to the fact that the elastic segment provides some cushioning function, the fatigability of the lens frame due to torsional load can be reduced. Moreover, even when an error is induced when cutting the spectacle lens, because the assemblage of the spectacle lens is not, to some degree, adversely influenced by such an error, the lens cutting operation can be performed in an easier manner.

In the drawings and specification, there have been disclosed typical preferred embodiments of the invention and, although specific terms are employed, they are used in generic and descriptive sense only and not for purposes of limiting the scope of the present invention as set forth in the following claims.

What is claimed is:

1. A lens frame for spectacles which comprises:

separate frame portions which are adapted to be joined together at their free ends to contain lenses to be provided therein, said free ends defining assembly pieces at opposite sides of the frame, an elastic segment disposed between the assembly pieces, and a connecting element for securing the assembly pieces and the elastic segment together.

2. The lens frame according to claim 1, wherein the assembly pieces and the elastic segment are provided with apertures and the connecting element passes through said apertures locking the assembly pieces and elastic segment together.

3. The lens frame according to claim 1, wherein the elastic segment is rubber or a foamed resin.

4. The lens frame according to claim 1, wherein the surfaces of the assembly pieces and the elastic segment have complimentary configurations to provide secure engagement between the respective elements.

5. The lens frame according to claim 1, wherein the inner surface of the elastic segment is provided with an engaging groove for engaging with a portion of the lens frame.

6. The lens frame according to claim 1, wherein the separate frame portions comprises an upper frame portion and a lower frame portion which, when joined together at their free ends define lens apertures for receiving the lenses.

* * * * *